United States Patent
Togawa

(10) Patent No.: US 9,645,350 B2
(45) Date of Patent: May 9, 2017

(54) LENS ASSEMBLY, LENS BARREL AND IMAGE CAPTURING APPARATUS

(71) Applicant: NIKON CORPORATION, Tokyo (JP)

(72) Inventor: Hisanori Togawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/198,063

(22) Filed: Mar. 5, 2014

(65) Prior Publication Data

US 2014/0233117 A1   Aug. 21, 2014

Related U.S. Application Data

(63) Continuation of application No. PCT/JP2012/005638, filed on Sep. 5, 2012.

(60) Provisional application No. 61/606,769, filed on Mar. 5, 2012.

(30) Foreign Application Priority Data

Sep. 6, 2011   (JP) .................................. 2011-194094

(51) Int. Cl.
    G02B 7/04    (2006.01)
    G02B 7/10    (2006.01)
    G03B 17/04   (2006.01)

(52) U.S. Cl.
    CPC .............. *G02B 7/04* (2013.01); *G02B 7/102* (2013.01); *G03B 17/04* (2013.01); *G03B 2205/0053* (2013.01)

(58) Field of Classification Search
    CPC . G02B 7/102; G02B 7/04; G02B 7/09; G02B 7/10; G02B 7/105; G02B 7/282; G02B 27/0103; G03B 2205/0053
    USPC ....... 359/823–826, 694–698; 396/77, 79–83, 396/85–88
    See application file for complete search history.

(56) References Cited

U.S. PATENT DOCUMENTS

| 2008/0225139 A1 | 9/2008 | Nomura et al. |
| 2010/0214666 A1 | 8/2010 | Fukino |
| 2010/0214671 A1 | 8/2010 | Fukino |

(Continued)

FOREIGN PATENT DOCUMENTS

| CN | 101813817 | 8/2010 |
| CN | 102132187 | 7/2011 |

(Continued)

OTHER PUBLICATIONS

International Search Report mailed Dec. 18, 2012 in corresponding International Application No. PCT/JP2012/005638.

(Continued)

*Primary Examiner* — Thomas K Pham
*Assistant Examiner* — Marin Pichler
(74) *Attorney, Agent, or Firm* — Staas & Halsey LLP

(57) ABSTRACT

A lens assembly includes a first lens holder that holds a first lens, a first guiding shaft that guides the first lens holder in a parallel direction to an optical axis of the first lens, a first driver that drives the first lens holder in an axial direction of the first guiding shaft, a second lens holder that holds a second lens that is different from the first lens, and a second driver that drives the second lens holder in a direction of the optical axis. Here, the first guiding shaft, the second driver, and the first driver are arranged in the stated order in a circumferential direction of a circle that is centered on the optical axis.

14 Claims, 13 Drawing Sheets

(56) References Cited

U.S. PATENT DOCUMENTS

| | | |
|---|---|---|
| 2011/0063742 A1 | 3/2011 | Mori |
| 2011/0149420 A1 | 6/2011 | Fukino |
| 2012/0050866 A1* | 3/2012 | Umezu ......................... 359/557 |
| 2013/0271861 A1 | 10/2013 | Fukino |

FOREIGN PATENT DOCUMENTS

| | | |
|---|---|---|
| JP | 2008-283668 | 11/2008 |
| JP | 2010-85918 | 4/2010 |
| JP | 2010-197625 | 9/2010 |
| JP | 2011-64970 | 3/2011 |

OTHER PUBLICATIONS

PCT International Preliminary Report on Patentability mailed Mar. 20, 2014 in corresponding International Application No. PCT/JP2012/005638.
Chinese Office Action dated Aug. 5, 2015 in corresponding Chinese Patent Application No. 201280042825.9.

* cited by examiner

LENS ASSEMBLY, LENS BARREL AND IMAGE CAPTURING APPARATUS

CROSS-REFERENCE TO RELATED APPLICATIONS

This application is a U.S. continuation application filed under 35 U.S.C. Section 111(a), of PCT International Application No. PCT/JP2012/005638, filed Sep. 5, 2012, which claims priority to Japanese Application No. 2011-194094, filed Sep. 6, 2011, and U.S. Provisional Application 61/606,769, filed on Mar. 5, 2012, the disclosures of which are hereby incorporated by reference.

BACKGROUND

1. Technical Field

The present invention relates to a lens assembly, a lens barrel and an image capturing apparatus.

2. Related Art

A lens barrel may have non-optical components such as actuators mounted therein as disclosed in, for example, Japanese Patent Application Publication No. 2003-005010.

In the lens barrel, the non-optical components are positioned away from the optical path of incident light. Therefore, an increased number of non-optical components results in a larger outer diameter of the lens barrel.

SUMMARY

A first aspect of the innovations may include a lens assembly including a first lens holder that holds a first lens, a first guiding shaft that guides the first lens holder in a parallel direction to an optical axis of the first lens, a first driver that drives the first lens holder in an axial direction of the first guiding shaft, a second lens holder that holds a second lens that is different from the first lens, and a second driver that drives the second lens holder in a direction of the optical axis. Here, the first guiding shaft, the second driver, and the first driver are arranged in the stated order in a circumferential direction of a circle that is centered on the optical axis.

A second aspect of the innovations may include a lens barrel including the above-described lens assembly, a retractable portion that is movable back and forth in a direction parallel to the optical axis relative to the lens assembly, and a retraction driver that drives the retractable portion. Here, the retraction driver and the second driver are positioned in different ones of the spaces that are defined within a plane orthogonal to the optical axis, between (i) one of the first drivers and (ii) one of the first guiding shafts and the second guiding shafts.

A third aspect of the innovations may include an image capturing apparatus including the above-described lens barrel, and an imaging element that forms an image from light that enters through the lens barrel.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
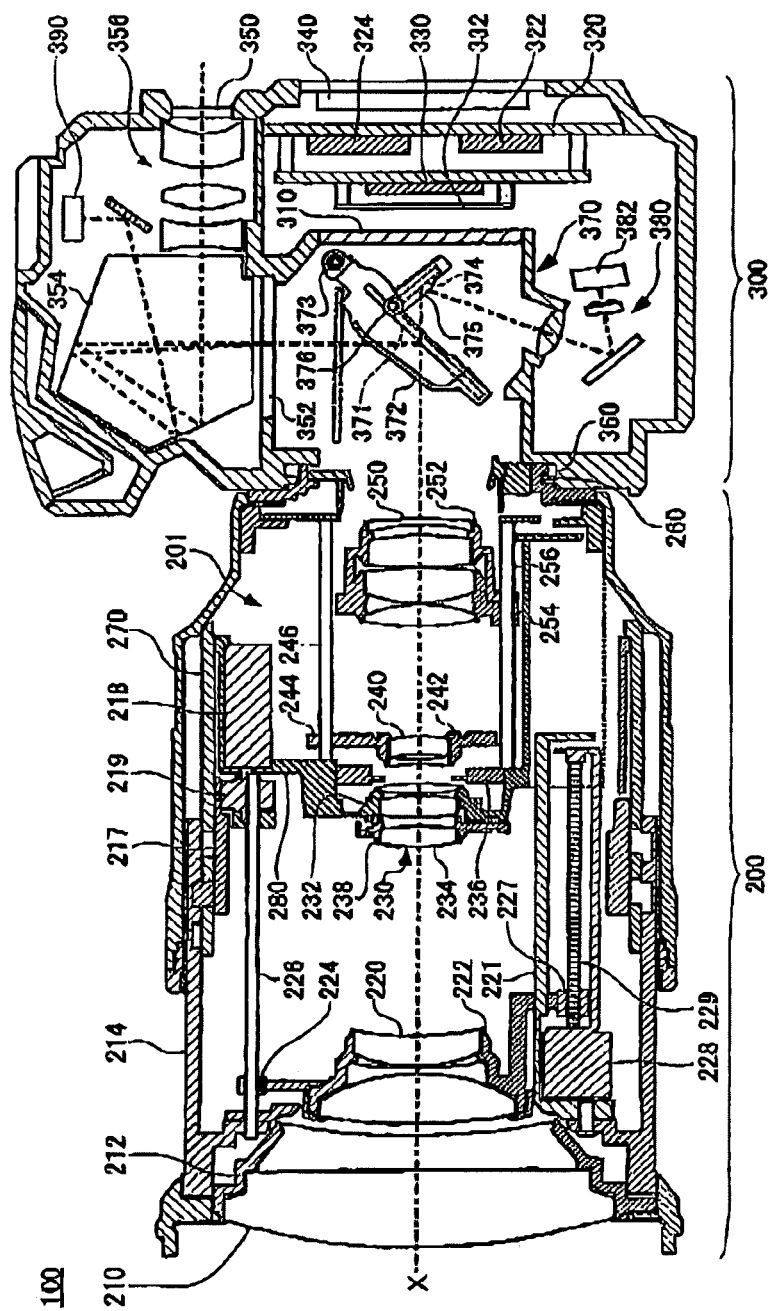
FIG. 1 is a schematic cross-sectional view of a single-lens reflex camera 100.

FIG. 1 is a schematic cross-sectional view showing a lens barrel 200. A single-lens reflex camera 100 includes the lens barrel 200 and a camera body 300. In FIG. 1, the lens barrel 200, which is loaded to form the single-lens reflex camera 100, is extended to its full length, in other words, in the extended state.

To simplify the explanation, the object-facing side of the lens barrel 200 that has been mounted on the camera body 300 will be referred to as the front or head side of the single-lens reflex camera 100 in the following. On the other hand, the side of the lens barrel 200 that faces away from the object will be referred to as the rear or back side of the single-lens reflex camera 100.

Furthermore, when used in the following description, the circumferential direction means the circumferential direction of the circular cross-section that can be obtained when the lens barrel 200 is cut along the plane orthogonal to the optical axis X. In addition, when used in the following description, the radial direction means the radial direction of the circular cross-section.

The lens barrel 200 includes an optical system constituted by a first lens group 210, a second lens group 220, a third lens group 230, a fourth lens group 240, and a fifth lens group 250 that are arranged along the optical axis X. The lens barrel 200 includes a cylinder 270 that is coupled to a lens mount portion 260, and a retractable portion 214 that is movable relative to the cylinder 270 in the optical axis X direction.

The cylinder 270 can be coupled to a body mount portion 360 of the camera body 300 by means of the lens mount portion 260 that is provided at the rear end thereof. This coupling allows the lens barrel 200 and the camera body 300 to form the single-lens reflex camera 100, which can be handled as a single component.

The coupling between the lens mount portion 260 and the body mount portion 360 can be undone in a predetermined manner. Thus, other lens barrels 200 having the lens mount portion 260 of the same standard can be mounted onto the camera body 300. Accordingly, the lens barrel 200 of the single-lens reflex camera 100 can be changed depending on the purpose of the image capturing.

The retractable portion 214 is supported by the cylinder 270 so as to be mobile in the direction parallel to the optical axis X. The retractable portion 214 can be driven by a drive ring 217 so as to move in the optical axis X direction relative to the cylinder 270 and thus to change the full length of the lens barrel 200. The drive ring 217 is rotated by a drive gear 219, which can be driven by a rotational actuator 218. The rotational actuator 218 that can move the retractable portion 214 back and forth can be preferably a DC motor having a large output torque.

Referring to the extended lens barrel 200 shown in FIG. 1, the retractable portion 214 has moved forward relative to the cylinder 270 to extend the lens barrel 200 to its full length. Thus, between the first lens group 210 and the third lens group 230, there is a gap formed in which the second lens group 220 can move.

The first lens group 210 is held by a first lens holder 212. The first lens holder 212 is fixed to the front end of, the retractable portion 21.4. Therefore, when the retractable portion 214 moves, the first lens group 210 moves in the optical axis X direction together with the retractable portion 214. The incident light flux that enters the first lens group 210 from the object-facing side of the lens barrel 200 transmits through the inside of the retractable portion 214 and reaches the second lens group 220.

The first lens group 210 moves only when the retractable portion 214 is moved to the extended or retracted state. In other words, the first lens group 210 does not move when the optical system of the lens barrel 200 is adjusted to achieve focusing or change the magnification ratio.

The second lens group 220 is held by a second lens holder 222. The second lens holder 222 engages with and is held by a second group guiding shaft 226 by means of an engaging portion 224. Since the front end of the second group guiding shaft 226 is fixed to the first lens holder 212, moving the first lens holder 212 results in moving the second lens holder 222, which is supported by the second group guiding shaft 226.

The second lens holder 222 has a rack 227 that is designed to mesh with a lead screw 229. The lead screw 229 is accommodated within a case 221 as well as the rotational actuator 228 and fixed to the first lens holder 212.

When the rotational actuator 228 is driven, the second lens holder 222, which is guided by the second group guiding shaft 226, moves in the optical axis X direction relative to the first lens holder 212. Thus, when the optical system of the lens barrel 200 is adjusted to change the magnification ratio, the second lens group 220 moves in the optical axis X direction relative to the first lens group 210.

The third lens group 230 is held by a third lens holder 232. The third lens holder 232 is fixed to a unit case 280. The unit case 280 is fixed to the cylinder 270. Therefore, the third lens group 230 does not move relative to the cylinder 270 when the lens barrel 200 moves between the extended state and the retracted state and also when the lens barrel 200 moves to change the magnification ratio or to achieve focusing.

The third lens group 230 includes a vibration-proof lens 234. The vibration-proof lens 234 is driven by a vibration-proof actuator 238 to be displaced in the direction intersecting the optical axis X. This can compensate for the image blur that may be caused by the displacement of the lens barrel 200.

The fourth lens group 240 and the fifth lens group 250 are respectively held by a fourth lens holder 242 and a fifth lens holder 252. The fourth lens holder 242 and the fifth lens holder 252 are respectively supported by a fourth group guiding shaft 246 and a fifth group guiding shaft 256.

The fourth group guiding shaft 246 and the fifth group guiding shaft 256 are fixed to the unit case 280. Therefore, the fourth lens holder 242 and the fifth lens holder 252 are respectively guided by the fourth group guiding shaft 246 and the fifth group guiding shaft 256 to individually move in the optical axis X direction relative to the third lens group 230 that is fixed to the unit case 280. In this manner, the fourth lens group 240 and the fifth lens group 250 contribute to allow the optical system of the lens barrel 200 to achieve focusing or to change the magnification ratio.

As described above, the unit case 280 directly or indirectly supports the third lens group 230, the fourth lens group 240 and the fifth lens group 250 to form a multiple group combined assembly 201 that is a lens assembly including multiple lens groups. Here, the unit case 280 also supports a diaphragm unit 236.

The camera body 300 includes a mirror unit 370 that is arranged behind the body mount portion 360. Below the mirror unit 370, a focusing optical system 380 is provided. Above the mirror unit 370, a focusing screen 352 is provided.

Furthermore, above the focusing screen 352, a penta prism 354 is provided. Behind the penta prism 354, a finder optical system 356 is provided. The rear end of the finder optical system 356 is externally exposed at the rear surface of the camera body 300 as a finder 350.

Behind the mirror unit 370, a shutter unit 310, a low-pass filter 332, an imaging element 330, a substrate 320, and a display portion 340 are arranged in the stated order. The display portion 340, which is formed by a liquid crystal display plate or the like, is on the rear surface of the camera body 300. The substrate 320 has a controller 322, an image processor 324 and the like mounted thereon.

The mirror unit 370 includes a main mirror 371 and a sub mirror 374. The main mirror 371 is supported by a main mirror holder 372, which is axially supported by a main mirror rotational axis 373.

The sub mirror 374 is supported by a sub mirror holder 375, which is axially supported by a sub mirror rotational axis 376. The sub mirror holder 375 rotates around the main mirror holder 372. Therefore, when the main mirror holder 372 rotates, the sub mirror holder 375 is also displaced together with the main mirror holder 372.

When the front edge of the main mirror holder 372 moves down, the main mirror 371 is positioned at angle on the incident light flux that enters through the lens barrel 200. When the main mirror holder 372 moves up, the main mirror 371 is positioned so as to avoid the incident light flux.

When the main mirror 371 is positioned on the incident light flux, the incident light flux that enters through the lens barrel 200 is reflected by the main mirror 371 to be guided towards the focusing screen 352. The focusing screen 352 is positioned so as to be conjugate with the optical system of the lens barrel 200 in order to visualize the image formed by the optical system of the lens barrel 200.

The image on the focusing screen 352 can be observed through the finder 350 via the penta prism 354 and the finder optical system 356. Here, when the image is observed through the penta prism 354, the user can observe an erected normal image through the finder 350.

An optical sensor 390 is arranged above the finder optical system 356 and receives part of the branch of the incident light flux. The optical sensor 390 detects the object luminance and allows the controller 322 to calculate an exposure condition, which is one of the image capturing conditions.

The main mirror 371 has a half mirror region that is configured to allow part of the incident light flux to transmit therethrough. The sub mirror 374 reflects the partial incident light flux that enters therein through the half mirror region towards the focusing optical system 380. The focusing optical system 380 guides the partial incident light flux that enters therein toward a focusing detection sensor 382. In this manner, the controller 322 determines target positions for the lenses that move to allow the optical system of the lens barrel 200 to achieve focusing.

In the single-lens reflex camera 100 having the lens barrel 200 and the camera body 300 described above, pressing a release button halfway activates the focusing detection sensor 382 and the optical sensor 390 to allow the single-lens reflex camera 100 to be ready for capturing an image of an object under appropriate conditions. If the release button is subsequently pressed all the way down, the main mirror 371 and the sub mirror 374 move to the withdrawn positions to open the shutter unit 310. Accordingly, the incident light flux that enters through the lens barrel 200 passes through the low-pass filter 332 and enters the imaging element 330.

Figure 2:
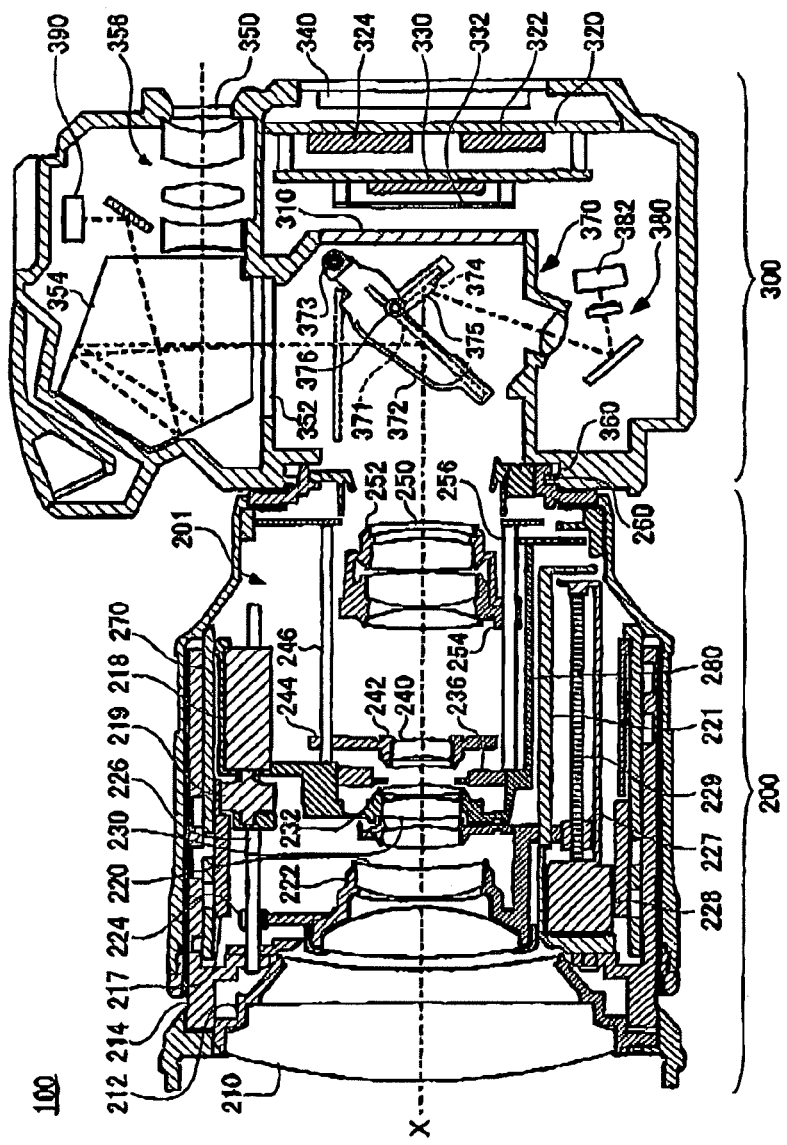
FIG. 2 is a schematic cross-sectional view of the single-lens reflex camera 100.

FIG. 2 is a schematic cross-sectional view illustrating the single-lens reflex camera 100. The common constituents between FIGS. 1 and 2 are assigned with the same reference numerals and not explained herein. Referring to the single-lens reflex camera 100 shown in FIG. 2, the lens barrel 200 is retracted.

When the lens barrel 200 is retracted, the retractable portion 214 has moved backward and is positioned closer to the camera body 300. Accordingly, the first lens group 210, which is held at the front end of the retractable portion 214, has also moved backward and is positioned closer to the third lens group 230. Since the second group guiding shaft 226 has moved backward together with the retractable portion 214, the second lens group 220, which is supported by the second group guiding shaft 226, has also moved backward.

Furthermore, the rotational actuator 228 and the lead screw 229 have also moved backward together with the first lens holder 212 and the retractable portion 214. The back end of the lead screw 229 and its adjacent portion move toward the lateral side of the third lens group 230, the fourth lens group 240 and the fifth lens group 250, so that the entire length of the lens barrel 200 becomes shorter.

As described above, when the lens barrel 200 is retracted, the first lens group 210, the second lens group 220 and the actuator 291 move backward so that the gaps between them become shorter and the entire length of the lens barrel 200 consequently becomes shorter. This conveniently allows the lens barrel 200 to be mobile.

Since the fourth lens group 240 and the fifth lens group 250 are positioned behind the third lens group 230 that is immobile relative to the cylinder 270, the fourth lens group 240 and the fifth lens group 250 do not need to move when the lens barrel 200 moves from the extended state to the retracted state. However, the fourth lens group 240 and the fifth lens group 250 may be moved to the initial positions as part of the operation to retract the lens barrel 200 to the retracted state, for the purpose of enabling the lens barrel 200 to immediately become ready for use when the lens barrel 200 is subsequently extended.

Figure 3:
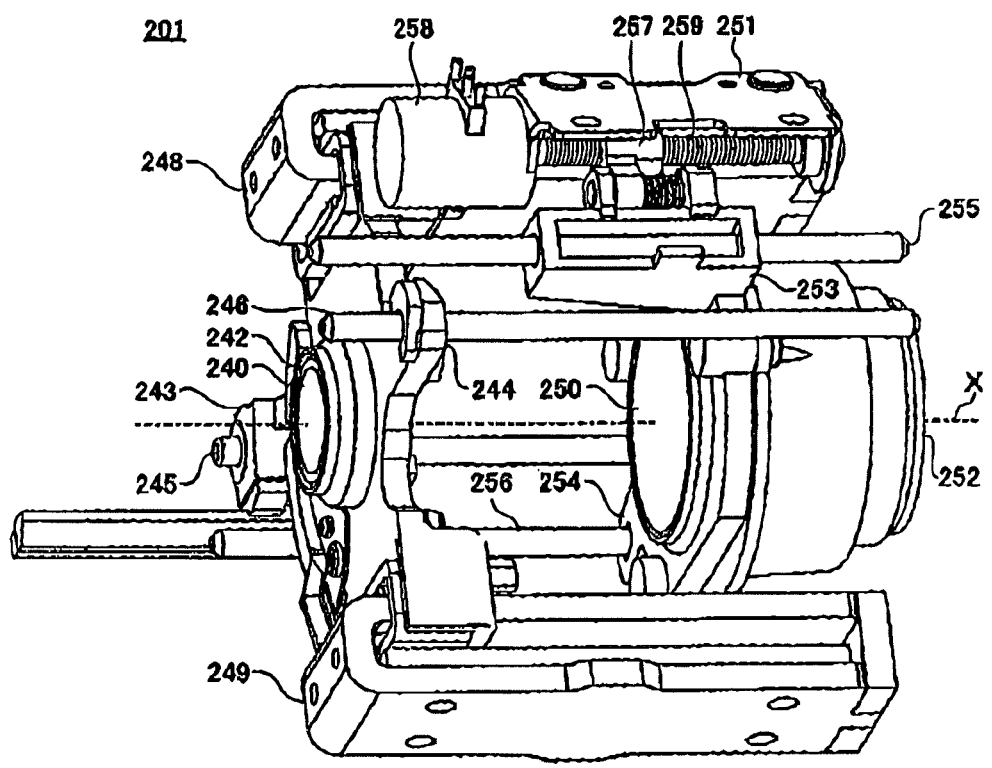
FIG. 3 is a perspective view showing the inside of a multiple group combined assembly 201.

FIG. 3 is a perspective view showing the multiple group combined assembly 201. In FIG. 3, the fourth lens group 240 and the fifth lens group 250 are taken out of the unit case 280, and the multiple group combined assembly 201 is seen from above slightly from the front side. The common constituents between FIGS. 1, 2 and 3 are assigned with the same reference numerals and not explained herein.

The fourth lens holder 242, which is designed to hold the fourth lens group 240, is supported by a pair of fourth group guiding shafts 245 and 246 that extend parallel to the optical axis X. The fourth group guiding shafts 245 and 246 are generally symmetrically arranged with respect to the optical axis X. Below the fourth lens holder 242, an interlocking portion 243 is provided that has an interlocking hole whose inner diameter is substantially the same as the outer diameter of the fourth group guiding shaft 245 on the left side in the drawing.

In this way, the movement of the interlocking portion 243 of the fourth lens holder 242 is limited by the fourth group guiding shaft 245 in the plane that is orthogonal to the optical axis X. In other words, the interlocking portion 243 moves in the axial direction of the fourth group guiding shaft 245 so that the fourth lens holder 242 can move in the optical axis X direction while being guided by the fourth group guiding shaft 245.

Above the fourth lens holder 242, an engaging portion 244 is provided that has an engaging hole having parallel planes the gap between which is substantially the same as the outer diameter of the fourth group guiding shaft 246 on the right side in the drawing. In this way, the engaging portion 244 can engage with the fourth group guiding shaft 246 in such a manner that the engaging portion 244 can move in at least one direction within a plane that is perpendicular to the optical axis X.

As described above, the fourth lens holder 242 is supported and guided by the pair of fourth group guiding shafts 245 and 246 in such a manner that the lower fourth group guiding shaft 245 serves as the main axis and the upper fourth group guiding shaft 246 serves as the sub axis. Since the pair of fourth group guiding shafts 245 and 246 are fixed onto the unit case 280, the fourth lens holder 242 can be moved in a direction parallel to the optical axis X relative to the unit case 280.

The fourth lens holder 242 is driven by a pair of linear actuators 248 and 249, which are not shown in the cross-sectional views in FIGS. 1 and 2. The linear actuators 248 and 249 are arranged symmetrically with respect to the optical axis X so as to extend horizontally in the drawing.

The fifth lens holder 252 that supports the fifth lens group 250 is supported by a pair of fifth group guiding shafts 255 and 256 that extend in the direction parallel to the optical axis X. The fifth group guiding shafts 255 and 256 are generally symmetrically arranged with respect to the optical axis X. Above the fifth lens holder 252, an interlocking portion 253 is provided that has an interlocking hole whose inner diameter is substantially the same as the outer diameter of the fifth group guiding shaft 255 on the right side in the drawing.

In this way, the movement of the interlocking portion 253 of the fifth lens holder 252 is limited by the fifth group guiding shaft 255 in the plane that is orthogonal to the optical axis X. In other words, the interlocking portion 253 moves in the axial direction of the fifth group guiding shaft 255 so that the fifth lens holder 252 can move in the optical axis X direction while being guided by the fifth group guiding shaft 255.

Below the fifth lens holder 252, an engaging portion 254 is provided that has an engaging hole having parallel planes the gap between which is substantially the same as the outer diameter of the fifth group guiding shaft 256 on the left side in the drawing. In this way, the engaging portion 254 can engage with the fifth group guiding shaft 256 in such a manner that the engaging portion 254 can move in at least one direction within a plane that is perpendicular to the optical axis X.

As described above, the fifth lens holder 252 is supported and guided by the pair of fifth group guiding shafts 255 and 256 in such a manner that the upper fifth group guiding shaft 255 serves as the main axis and the lower fifth group guiding shaft 256 serves as the sub axis. Since the pair of fifth group guiding shafts 255 and 256 are fixed onto the unit case 280, the fifth lens holder 252 can be moved in the direction parallel to the optical axis X relative to the unit case 280.

The fifth lens holder 252 is driven by a drive mechanism including the rotational actuator 258 and the lead screw 259, which are not shown in the cross-sectional views of FIGS. 1 and 2. The rotational actuator 258 is integrated with the lead screw 259, which is arranged parallel to the optical axis X, by means of a bracket 251 and is configured to rotate the lead screw 259.

The lead screw 259 meshes with the rack 257, which is coupled to the interlocking portion 253. Accordingly, when the rotational actuator 258 is driven, the fifth lens holder 252 is moved in the direction parallel to the optical axis X. The rotational actuator 258 can be preferably a stepping motor or the like, which can be accurately controllable in terms of the amount of the movement.

Figure 4:
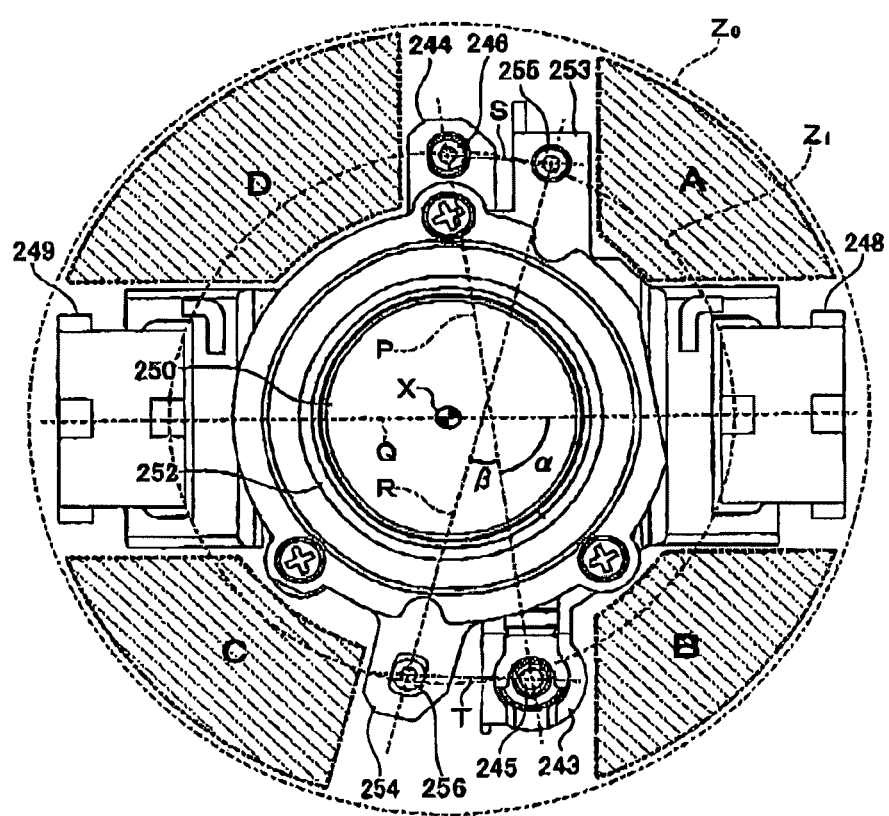
FIG. 4 is a partial rear view of the multiple group combined assembly 201.

FIG. 4 is a rear view of the assembly shown in FIG. 3. FIG. 4 shows how the fourth lens holder 242, the fifth lens holder 252, the fourth group guiding shafts 245 and 246, the fifth group guiding shafts 255 and 256, and the linear actuators 248 and 249 are positioned relative to each other. The common constituents between FIGS. 3 and 4 are assigned with the same reference numerals and not explained herein.

Here, an angle $\alpha$ denotes a smaller one of the angles formed by the straight line P connecting the fourth group guiding shafts 245 and 246 and the straight line Q connecting the linear actuators 248 and 249, and is close to 90 degrees. Thus, the fourth group guiding shafts 245 and 246 are arranged substantially 90 degrees away in phase from the linear actuators 248 and 249, which constitute a driver, in the circumferential direction of the multiple group combined assembly 201. In other words, the fourth group guiding shafts 245 and 246 and the linear actuators 248 and 249 are arranged at substantially even intervals in the circumferential direction of the multiple group combined assembly 201.

In this manner, the driving force produced by the linear actuators 248 and 249 can be well balanced and act against the sliding friction between the fourth group guiding shafts 245 and 246 and the interlocking and engaging portions 243 and 244, thereby efficiently driving the fourth lens group 240.

Here, an angle $\beta$ denotes a smaller one of the angles formed by the straight line R connecting the fifth group guiding shafts 255 and 256 and the straight line P, the angle $\alpha$ is preferably set larger than the angle $\beta$ in a case where the angle $\alpha$ is smaller than 90 degrees. By doing so, the fourth group guiding shafts 245 and 246 are arranged closer to the fifth group guiding shafts 255 and 256 on the circumference of a circle $Z_1$ shown by the dashed-dotted line in FIG. 4. At the same time, the fourth group guiding shafts 245 and 246 and the fifth group guiding shafts 255 and 256 are arranged away from the linear actuators 248 and 249 on the circumference of the circle $Z_1$.

Furthermore, the distance between the fourth group guiding shafts 245 and 246 is substantially the same as the distance between the fifth group guiding shafts 255 and 256, and the fourth group guiding shafts 245 and 246 are positioned near the fifth group guiding shafts 255 and 256 on the common circle $Z_1$. Accordingly, the straight line S connecting the fourth group guiding shaft 246 and the fifth group guiding shaft 255 is substantially parallel to the straight line T connecting the fourth group guiding shaft 245 and the fifth group guiding shaft 256 in FIG. 4.

When arranged in the above-described manner, (i) the fourth group guiding shafts 245 and 246 and the fifth group guiding shafts 255 and 256 and (ii) the linear actuators 248 and 249 form four large spaces A, B, C and D therebetween. The spaces A, B, C and D are formed within a circle $Z_0$ whose diameter extends between the radially outer ends of the linear actuators 248 and 249.

These spaces A, B, C and D can eliminate the need of increasing the outer diameter of the multiple group combined assembly 201. The spaces A, B, C and D can be used to accommodate therein, for example, the driver, interconnections and electronic circuits for the fifth lens group 250 and the like. In addition, the spaces A, B, C and D can be used to accommodate other components, for example, the guiding shafts, driver, interconnections and the like for the second lens group 220, or the driver and the like for the retractable portion 214.

On the circumference of the circle $Z_1$, the fourth group guiding shaft 246, which serves as the sub axis, may be positioned in the vicinity of the fifth group guiding shaft 255, which serves as the main axis. Likewise, on the circumference of the circle $Z_1$, the fourth group guiding shaft 245, which serves as the main axis, may be positioned in the vicinity of the fifth group guiding shaft 256, which serves as the sub axis. Here, the driver and the like for each lens group are arranged in the vicinity of the main axis in the circumferential direction of the circle $Z_1$ and the above-described arrangement enables the driver and the like for each lens group to be positioned in a different space. The following specifically describes how the above-described spaces A, B, C and D are used as an example.

Figure 5:
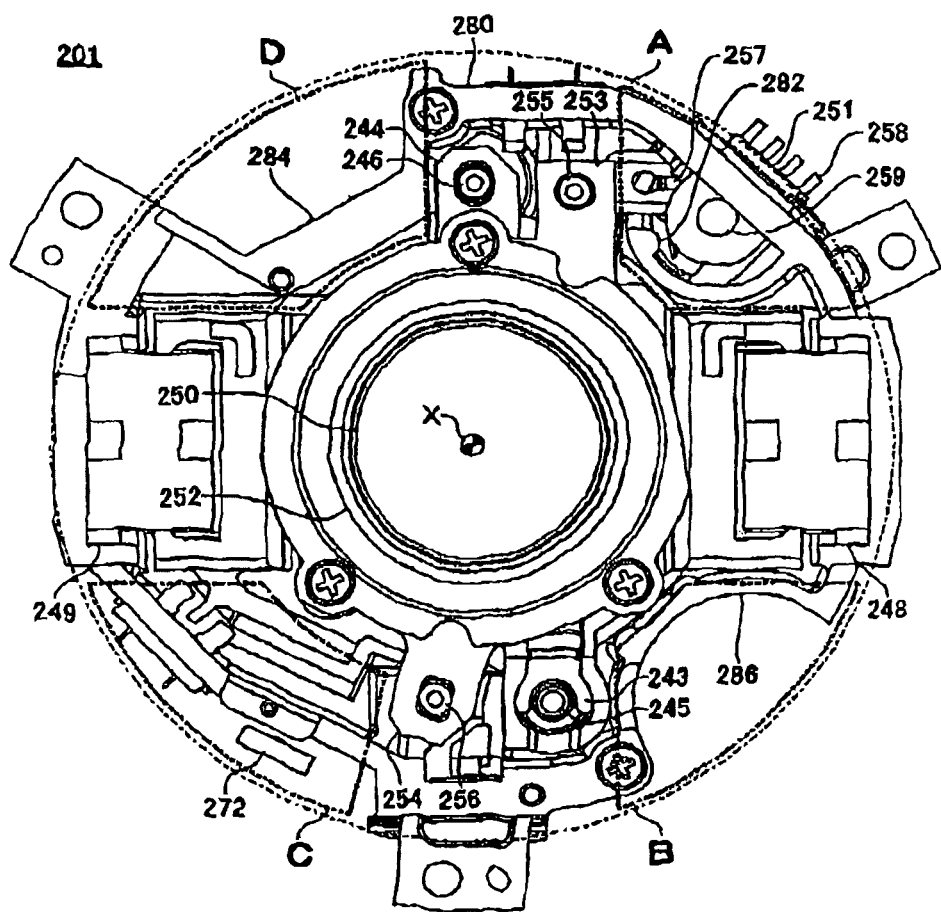
FIG. 5 is a rear view of the multiple group combined assembly 201.

FIG. 5 is a rear view illustrating the multiple group combined assembly 201. In FIG. 5, the constituents shown in FIG. 3 are incorporated into the unit case 280. The common constituents through FIGS. 1 to 5 are assigned with the same reference numerals and not explained herein.

The unit case 280 is designed to house therein the fourth lens holder 242, the fifth lens holder 252, the fourth group guiding shafts 245 and 246, the fifth group guiding shafts 255 and 256, and the linear actuators 248 and 249. The linear actuators 248 and 249 are supported by the unit case 280 and thus stationary relative to the unit case 280.

The front ends of the fourth group guiding shafts 245 and 246 and the front ends of the fifth group guiding shafts 255 and 256 are fixed onto the third lens holder 232, which is integrated into the unit case 280 and configured to hold the third lens group 230. Therefore, the fourth lens holder 242, which is configured to be guided by the fourth group guiding shafts 245 and 246, is driven by the linear actuators 248 and 249 to move relative to the unit case 280.

In the unit case 280, the portion corresponding to the space A shown in FIG. 4 is an actuator housing portion 282.

The actuator housing portion 282 houses therein the rotational actuator 258 and the lead screw 259, which are configured to drive the fifth lens holder 252.

Into the actuator housing portion 282, the rack 257 that has been coupled with the interlocking portion 253 of the fifth lens holder 252 is inserted. The rack 257 meshes with the lead screw 259 within the actuator housing portion 282. This enables the fifth lens holder 252 to be driven by the rotational actuator 258 and to move relative to the unit case 280 while being guided by the fifth group guiding shafts 255 and 256.

In the unit case 280, the portions corresponding to the spaces B and D shown in FIG. 4 are used to house therein a pair of large groove portions 284 and 286 that extend in the direction along the optical axis X of the multiple group combined assembly 201. Each of the large groove portions 284 and 286 opens outwardly in the radial direction of the multiple group combined assembly 201. Furthermore, in the unit case 280, the portion corresponding to the space C shown in FIG. 4 has a guide plate 272 therein. The guide plate 272 extends in the direction parallel to the optical axis X.

Figure 6:
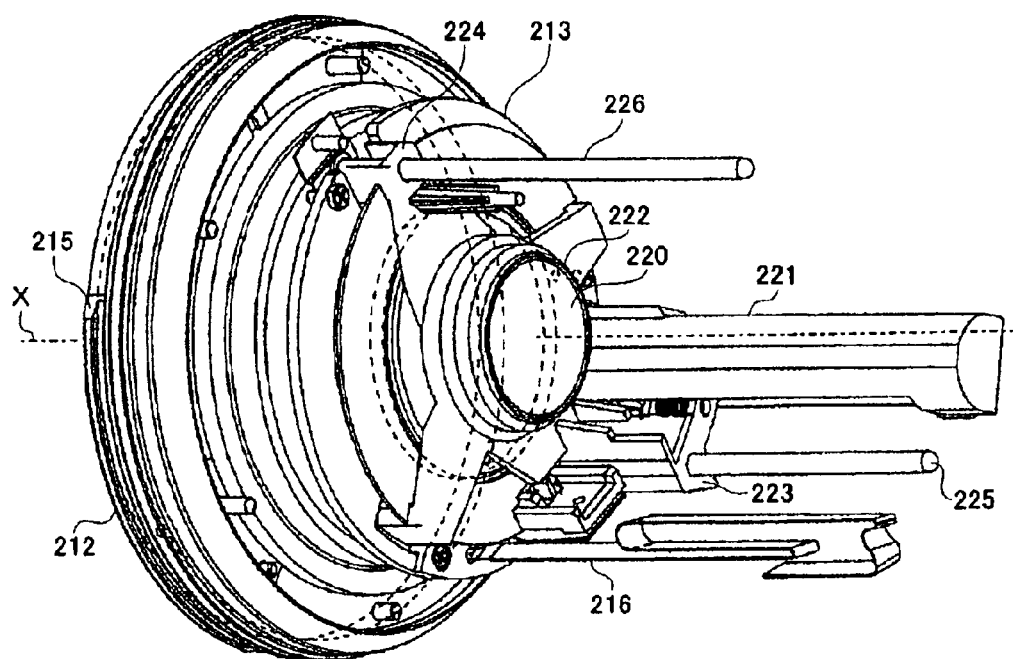
FIG. 6 is a perspective view showing a first lens group 210 and a second lens group 220.

FIG. 6 is a perspective view illustrating the first lens holder 212 and the second lens holder 222, which have been taken out from the lens barrel 200. In FIG. 6, the first lens holder 212 and the second lens holder 222 are seen from above obliquely. The common constituents between FIGS. 1, 2 and 6 are assigned with the same reference numerals and not explained herein.

The first lens holder 212, which holds the first lens group 210, is positioned at the front end of the lens barrel 200. Therefore, the first lens holder 212 has a lens mount tab 215 on its circumference. The lens mount tab 215 is used to mount accessories such as a hood. The first lens holder 212 has the largest outer diameter among the components of the lens barrel 200.

The second lens holder 222 is supported by the pair of second group guiding shafts 225 and 226. The second group guiding shaft 225, which is positioned lower in the drawing, is fixed at the front end thereof onto a flange 213 that is positioned on the rear surface of the first lens holder 212, and extends backwards parallel to the optical axis X. The interlocking portion 223, which is positioned under the second lens holder 222, has an interlocking hole whose inner diameter is substantially the same as the outer diameter of the second group guiding shaft 225.

In this manner, the movement of the interlocking portion 223 of the second lens holder 222 is limited by the second group guiding shaft 225 in the plane perpendicular to the optical axis X. In other words, the interlocking portion 223 is movable in the axial direction of the second group guiding shaft 225, and the second lens holder 222 is movable in the optical axis X direction by being guided by the second group guiding shaft 225.

The second group guiding shaft 226, which is positioned upper in the drawing, is also fixed at the front end thereof onto the flange 213 and extends backwards parallel to the optical axis X. The engaging portion 224, which is positioned above the second lens holder 222, has an engaging hole having parallel planes the gap between which is substantially the same as the outer diameter of the second group guiding shaft 226. In this manner, the engaging portion 224 engages with the second group guiding shaft 226 in such a manner that the engaging portion 224 can be moved in at least one direction within the plane perpendicular to the optical axis X, and is prevented from rotating around the second group guiding shaft 225.

As described above, the second lens holder 222 is supported and guided by the pair of second group guiding shafts 225 and 226, which are fixed onto the first lens holder 212, in such a manner that the lower second group guiding shaft 225 serves as the main axis and the upper second group guiding shaft 226 serves as the sub axis. In this manner, the second lens holder 222 can move in the direction parallel to the optical axis X relative to the first lens holder 212.

The case 221 and a flexible printed substrate 216 extend backward from the flange 213 of the first lens holder 212. As described earlier, the case 221 houses therein the rotational actuator 228 and the lead screw 229.

The flexible printed substrate 216 is soft and can electrically couple the first lens bolder 212 to the cylinder 270 without obstructing the movement of the first lens holder 212. In this manner, the rotational actuator 228, which is fixed onto the first lens holder 212 that is configured to move relative to the cylinder 270, can receive power supply.

Figure 7:
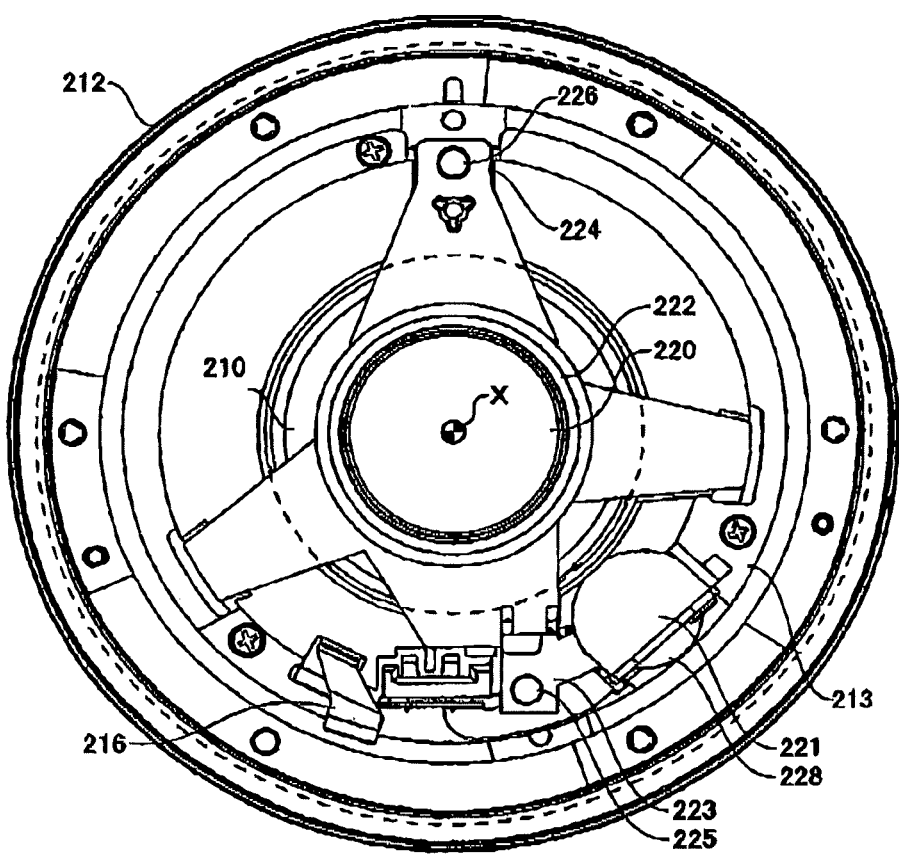
FIG. 7 is a rear view showing the first lens group 210 and the second lens group 220.

FIG. 7 illustrates the assembly shown in FIG. 6 from the rear side of the lens barrel 200. The common constituents between FIGS. 6 and 7 are assigned with the same reference numerals and not explained herein.

The second group guiding shafts 225 and 226 are arranged generally symmetrically with respect to the optical axis X so as to be spaced away from each other in the circumferential direction of the circle centering on the optical axis X. The case 221, which extends towards the observer of the drawing, is positioned adjacent to the side of the second group guiding shaft 225 in the circumferential direction of the circle centering on the optical axis X.

The flexible printed substrate 216, which extends towards the observer of the drawing, is positioned adjacent to the side of the second group guiding shaft 225. On the opposite side of the case 221, in the circumferential direction of the circle centering on the optical axis X. Note that the flexible printed substrate 216 is positioned further away from the second group guiding shaft 225 than the case 221 is.

Figure 8:
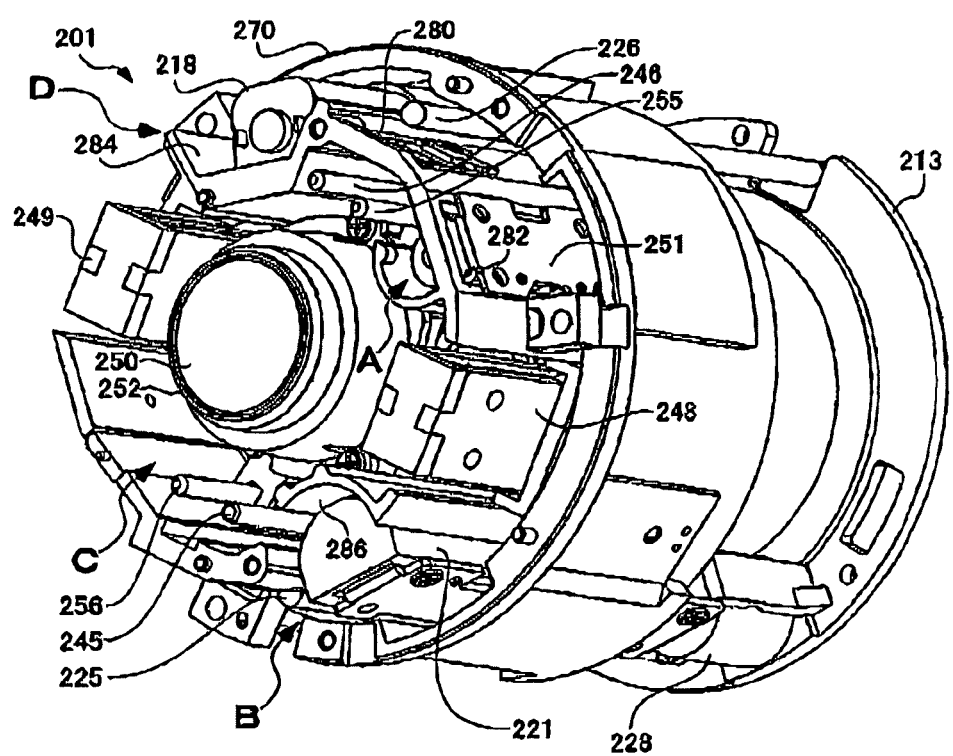
FIG. 8 is a perspective view showing the inside of a lens barrel 200.

FIG. 8 is a perspective view illustrating how the components are arranged within the lens barrel 200 when seen obliquely from behind. The common constituents through FIGS. 1 to 8 are assigned with the same reference numerals and not explained herein.

FIG. 8 illustrates that the multiple group combined assembly 201 shown in FIG. 5, the cylinder 270, and the assembly of the first lens group 210 and the second lens group 220 shown in FIGS. 6 and 7 are incorporated into the lens barrel 200. However, the first lens holder 212 is not shown, and the rear portion starting from the flange 213 is shown.

As explained earlier, the fifth lens group 250, the fifth lens holder 252, the pair of fourth group guiding shafts 245 and 246, the pair of fifth group guiding shafts 255 and 256, the pair of linear actuators 248 and the like are housed within the unit case 280. In the actuator housing portion 282 in the unit case 280, the rotational actuator 258, which is supported by the bracket 251, and the like are housed.

The unit case 280 housing therein the above-mentioned components is inserted into the cylinder 270. In this case, a cylindrical space is formed so as to extend in the direction parallel to the optical axis X between the pair of large groove portions 284 and 286, which are formed outside the unit case 280 and the inner surface of the cylinder 270. The unit case 280 does not move forward or backward within the cylinder 270 and is thus fixed onto the cylinder 270.

Here, the case 221 that extends backward from the flange 213 is inserted into the multiple group combined assembly 201 that has been fixed onto the cylinder 270 in the above-described manner in such a manner that the case 221 is positioned in the space B between the large groove portion 286 and the cylinder 270. In this manner, the first lens holder 212 can move forward and backward relative to the cylinder 270 without interfering with the multiple group combined assembly 201.

Figure 9:
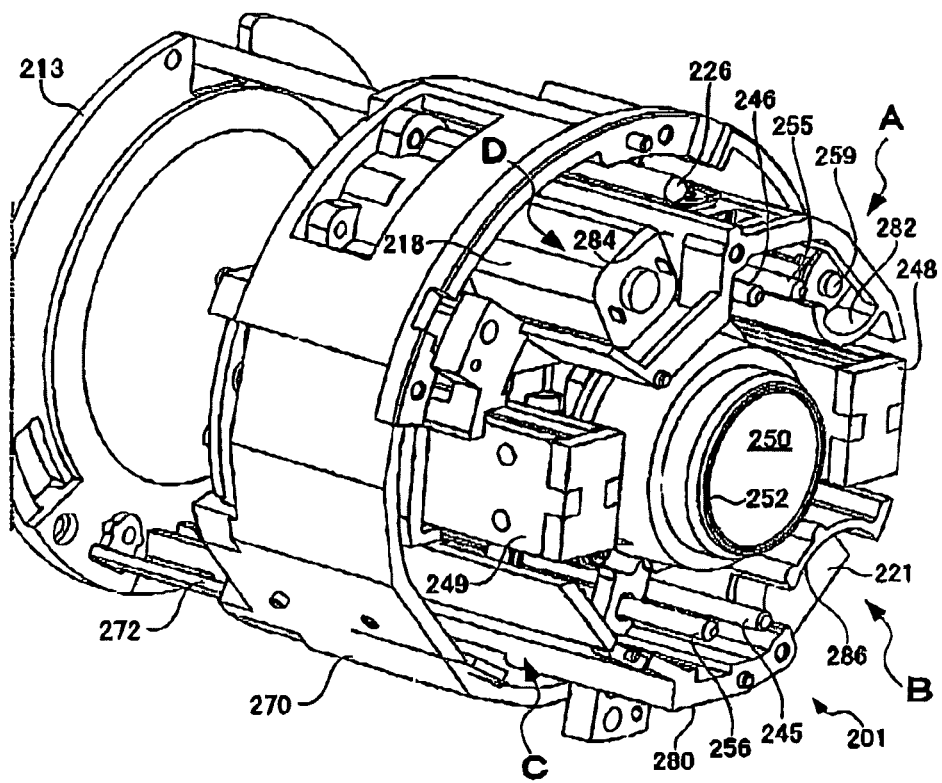
FIG. 9 is a perspective view showing the inside of the lens barrel 200.

FIG. 9 is a perspective view illustrating how the components are arranged within the lens barrel 200 when seen obliquely from behind. The common constituents through FIGS. 1 to 9 are assigned with the same reference numerals and not explained herein.

FIG. 9 shows how the components are arranged within the lens barrel 200 from the opposite perspective to FIG. 8. In FIG. 9, the rotational actuator 218, which is configured to move forward and backward the retractable portion 214, is housed between the large groove portion 284 of the unit case 280 and the cylinder 270. The rotational actuator 218 rotates the drive ring 217 that is arranged within the cylinder 270.

From the perspective shown in FIG. 9, it can be seen that the guide plate 272, which extends backward from the flange 213, is inserted into the space C in the multiple group combined assembly 201. The guide plate 272 supports and guides the flexible printed substrate 216, which supplies power to the rotational actuator 228 housed within the case 221.

Figure 10:
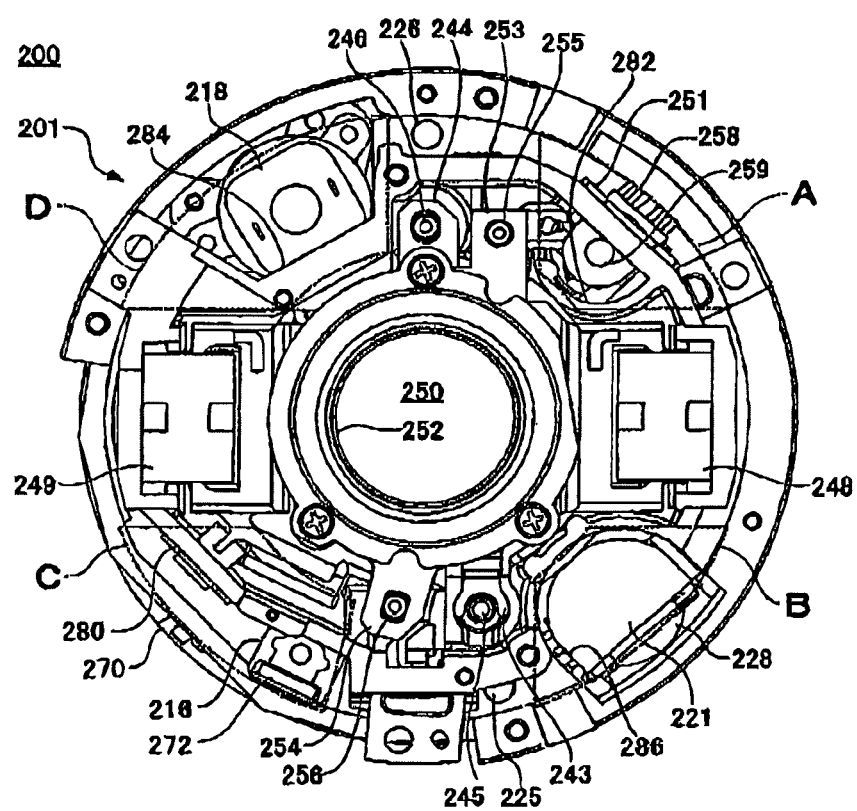
FIG. 10 is a rear view showing the inside of the lens barrel 200.

FIG. 10 is a rear view illustrating the assembly shown in FIGS. 8 and 9 from behind. Likewise in FIGS. 8 and 9, the first lens holder 212 is not shown. The common constituents through FIGS. 1 to 10 are assigned the same reference numerals and not explained herein.

As shown in FIG. 10, the driver for the fifth lens holder 252, such as the rotational actuator 258, is arranged within the space A in the multiple group combined assembly 201. In the space B, the driver for the second lens holder 222, such as the case 221, is arranged. In the space C, the flexible printed substrate 216 and the guide plate 272 are arranged. In the space D, the rotational actuator 218, which is configured to move forward and backward the retractable portion 214, is arranged.

As described above, in the lens barrel 200, the rotational actuators 218, 228 and 258 and the flexible printed substrate 216 are arranged within the spaces A, B, C and D that are formed between (i) the fourth group guiding shafts 245 and 246 and the fifth group guiding shafts 255 and 256 that are arranged in the vicinity of each other in the circumferential direction of the lens barrel 200 and (ii) the linear actuators 248 and 249 that are spaced away from the guiding shafts in the circumferential direction. In this manner, more non-optical components can be mounted without the need of increasing the diameter of the lens barrel 200.

Figure 11:
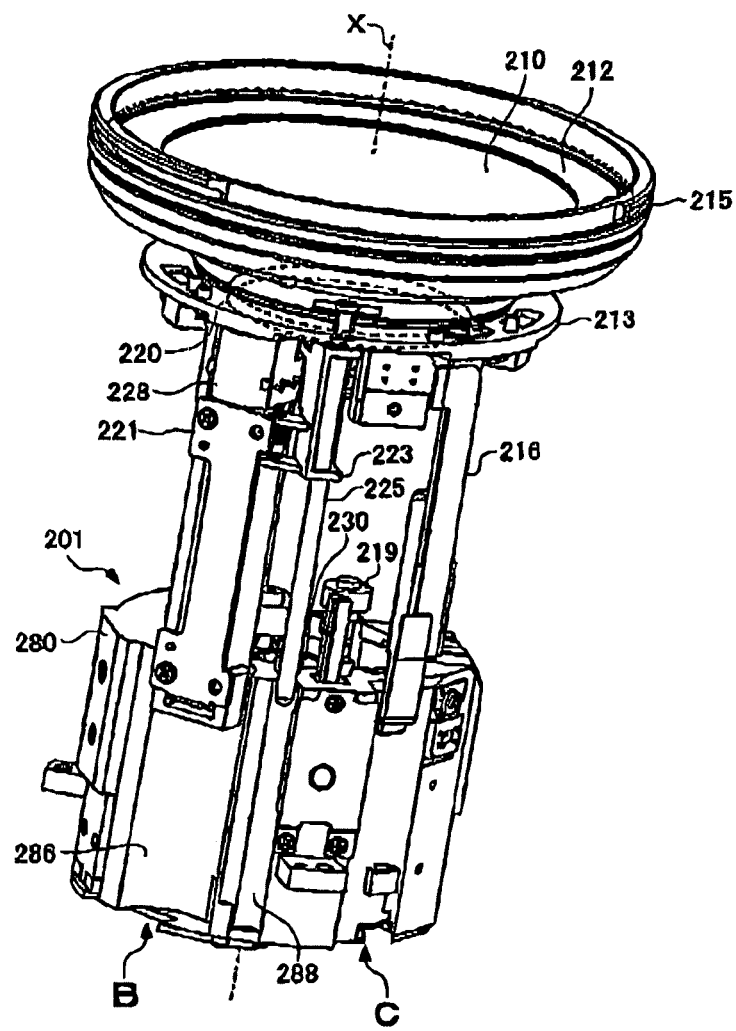
FIG. 11 is a perspective view showing the inside of the lens barrel 200.

FIG. 11 is a perspective view illustrating the assembly shown in FIGS. 8, 9 and 10, from which the cylinder 270 has been removed. The common constituents through FIGS. 1 to 11 are assigned with the same reference numerals and not explained herein.

FIG. 11 shows the lower surface of the first lens holder 212 and the lower surface of the multiple group combined assembly 201 from below slightly from the front side. It can be seen that a small groove portion 288 is provided adjacent to the large groove portion 286 formed in the space B on the lower surface of the unit case 280. Into the small groove portion 288, the rear end of the second group guiding shaft 225, which moves backward and forward together with the flange 213 of the first lens holder 212, is inserted. In this manner, even though the second group guiding shaft 225 moves backward and forward together with the first lens holder 212, they do not interfere with the multiple group combined assembly 201.

Figure 12:
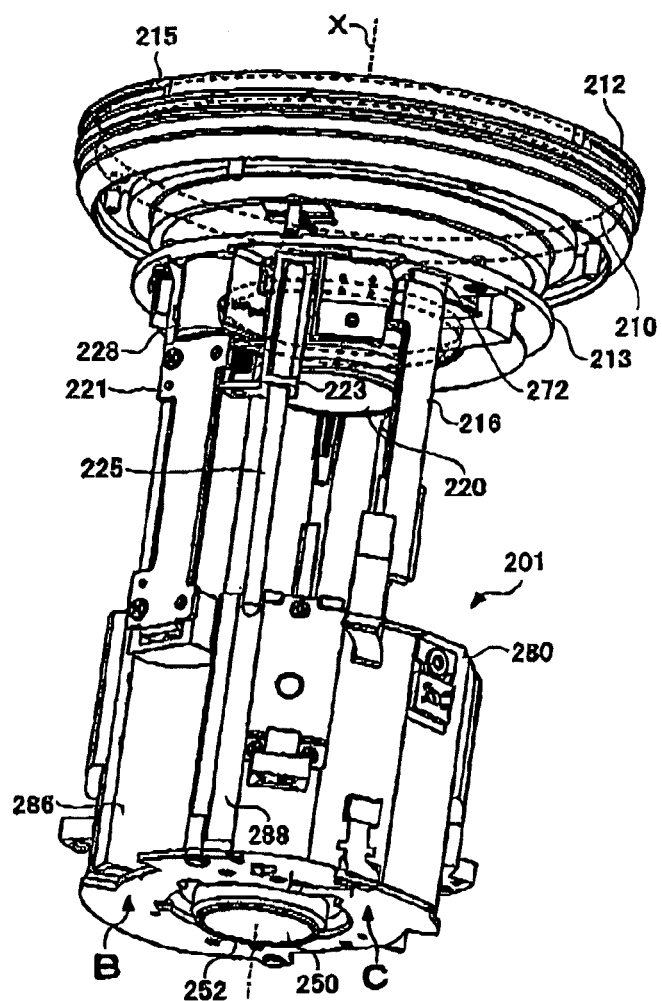
FIG. 12 is a perspective view showing the inside of the lens barrel 200.

FIG. 12 shows the lower surface of the first lens holder 212 and the lower surface of the multiple group combined assembly 201 from below slightly from the rear side. It can be seen that the flexible printed substrate 216 is attached to and supported by the guide plate 272, which extends backward from the rear surface of the flange 213.

It also can be seen that, in the lower surface of the unit case 280, a space may be formed that allows the rear edge of the flexible printed substrate 216 and the rear edge of the guide plate 272 to move backward without interfering with the unit case 280.

Figure 13:
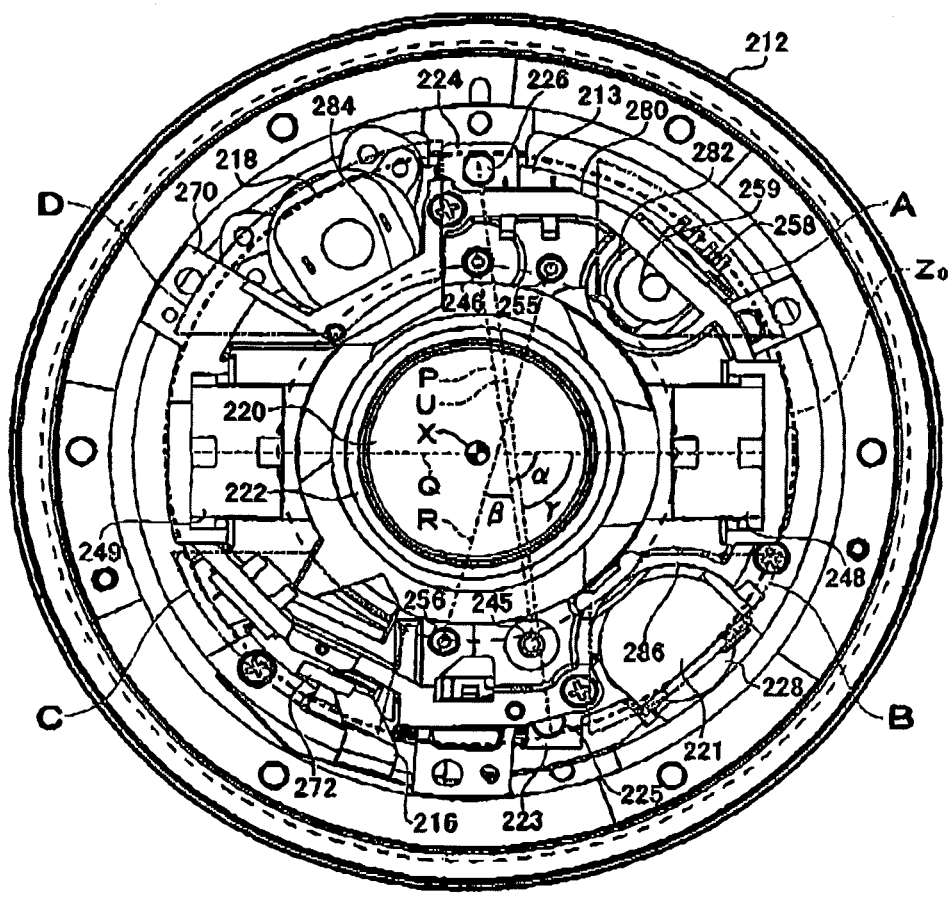
FIG. 13 is a rear view showing the inside of the lens barrel 200.

FIG. 13 is a schematic rear view illustrating how the components are arranged within the lens barrel 200. The common constituents through FIGS. 1 to 13 are assigned with the same reference numerals and not explained herein.

FIG. 13 shows the lens barrel 200 shown in FIG. 10, from which the fourth lens holder 242 and the fifth lens holder 252 have been removed. Thus, the second lens group 220 and the second lens holder 222 can be seen within the unit case 280.

It also can be seen that, above the fourth group guiding shaft 246 positioned in the top portion of the lens barrel 200, the second group guiding shaft 226 engages with the engaging portion 224 of the second lens holder 222. Furthermore, it can be seen that, below the fourth group guiding shaft 245 positioned in the bottom portion of the lens barrel 200, the second group guiding shaft 225 interlocks with the interlocking portion 223 of the second lens holder 222.

As described above, the second group guiding shafts 225 and 226 are positioned in the vicinity of the fourth group guiding shafts 245 and 246 in the lens barrel 200. In this manner, the straight line P connecting the fourth group guiding shafts 245 and 246 is substantially parallel to and close to the straight line U connecting the second group guiding shafts 225 and 226. Accordingly, an angle γ, which is a smaller one of the angles formed between the straight line U and the above-described straight line Q, is substantially equal to the angle β. Therefore, the relation between the angle α and the angle β holds true for the angle γ.

As described above, the second group guiding shafts 225 and 226 are arranged in the vicinity of the fourth group guiding shafts 245 and 246 and the fifth group guiding shafts 255 and 256 in the circumferential direction of the lens barrel 200. Accordingly, even when the second group guiding shafts 225 and 226 are inserted into the small groove portion 288 of the unit case 280, the spaces A, B, C and D are not reduced. Therefore, the spaces A, B, C and D can be used to house the rotational actuators 218, 228 and 258, the flexible printed substrate 216 and the like.

The above description has been made taking the single-lens reflex camera 100 having the changeable lens barrel 200 as an example. However, the above-described structure can be employed for a camera having the lens barrel 200 and the camera body 300 integrated with each other. Also, a similar structure can be employed for the lens barrel 200 for use with a mirrorless camera, which does not have the main mirrors 371 and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A lens assembly comprising:
a first lens holder that holds a first lens;
a first guiding shaft that guides the first lens holder in a parallel direction to an optical axis of the first lens, the first guiding shaft including a pair of first guiding shafts that are arranged so as to oppose each other with the first lens therebetween;
a first driver including a pair of first drivers that drive the first lens holder in an axial direction of the first guiding shaft, the pair of first drivers being arranged so as to oppose each other with the optical axis therebetween;
a second lens holder that holds a second lens that is different from the first lens;
a second driver that drives the second lens holder in a direction of the optical axis; and
a second guiding shaft that guides the second lens holder parallel to the optical axis, wherein
the first guiding shaft, the second driver, and the first driver are arranged in the stated order in a circumferential direction of a circle that is centered on the optical axis,
the pair of first drivers and the pair of first guiding shafts are arranged at substantially even intervals in the circumferential direction,
the second guiding shaft includes a pair of second guiding shafts that are arranged so as to oppose each other with the second lens therebetween,
one of the first guiding shafts and one of the second guiding shafts are arranged closer to each other than to the nearest first driver between the pair of first drivers, and
the other of the first guiding shafts and the other of the second guiding shafts are arranged closer to each other than to the nearest first driver between the pair of first drivers.

2. The lens assembly as set forth in claim 1, wherein the first guiding shaft, the second guiding shaft, the second driver, and the first driver are arranged in the stated order in the circumferential direction of the circle that is centered on the optical axis.

3. The lens assembly as set forth in claim 1, wherein a smaller one of angles formed by a straight line connecting the first guiding shafts and a straight line connecting the first drivers is larger than a smaller one of angles formed by a straight line connecting the first guiding shafts and a straight line connecting the second guiding shafts.

4. The lens assembly as set forth in claim 1, wherein a straight line connecting one of the first guiding shafts and one of the second guiding shafts is substantially parallel to a straight line connecting the other of the first guiding shafts and the other of the second guiding shafts.

5. The lens assembly as set forth in claim 1, wherein the first driver includes a linear actuator, and the second driver includes a rotational motor and a lead screw coupled to the rotational motor.

6. The lens assembly as set forth in claim 1, wherein movement of the second lens holder is limited within a plane orthogonal to the optical axis by one of the second guiding shafts, and the second lens holder engages with the other of the second guiding shafts with an engaging portion having parallel planes, the gap between which is substantially the same as the outer diameter of the other of the second guiding shafts.

7. A lens barrel comprising:
the lens assembly as set forth in claim 1;
a retractable portion that is movable back and forth in a direction parallel to the optical axis relative to the lens assembly; and
a retraction driver that drives the retractable portion, wherein
the retraction driver and the second driver are positioned in different ones of the spaces that are defined within a plane orthogonal to the optical axis, between (i) one of the first drivers and (ii) one of the first guiding shafts and the second guiding shafts.

8. The lens barrel as set forth in claim 7, further comprising:
a third lens holder that holds a third lens that is different from the first lens and the second lens; and
a pair of third guiding shafts that are fixed at one end thereof to the retractable portion and positioned so as to oppose each other with the optical axis therebetween, the third guiding shafts guiding the third lens holder in a direction parallel to the optical axis, wherein
the third guiding shafts are arranged in a vicinity of the first guiding shafts and the second guiding shafts within a plane orthogonal to the optical axis.

9. An image capturing apparatus comprising:
the lens barrel as set forth in claim 7; and
an imaging element that forms an image from light that enters through the lens barrel.

10. The lens barrel as set forth in claim 1, wherein the pair of first guiding shafts and the pair of second guiding shafts are positioned at substantially the same distance from the optical axis.

11. A lens assembly comprising:
a first lens holder that holds a first lens;
a first guiding shaft that guides the first lens holder in a parallel direction to an optical axis of the first lens, the first guiding shaft including a pair of first guiding shafts that are arranged so as to oppose each other with the first lens therebetween;
a first driver including a pair of first drivers that drive the first lens holder in an axial direction of the first guiding shaft, the pair of first drivers being arranged so as to oppose each other with the optical axis therebetween;
a second lens holder that holds a second lens that is different from the first lens;
a second driver that drives the second lens holder in a direction of the optical axis; and
a second guiding shaft that guides the second lens holder parallel to the optical axis, wherein
the first guiding shaft, the second driver, and the first driver are arranged in the stated order in a circumferential direction of a circle that is centered on the optical axis,
a radial distance from the first guiding shaft to the first driver through the second driver is about 90°,
the second guiding shaft includes a pair of second guiding shafts that are arranged so as to oppose each other with the second lens therebetween,
one of the first guiding shafts and one of the second guiding shafts are arranged closer to each other than to the nearest first driver between the pair of first drivers, and
the other of the first guiding shafts and the other of the second guiding shafts are arranged closer to each other than to the nearest first driver between the pair of first drivers.

12. The lens assembly as set forth in claim 11 wherein the first driver includes a pair of drivers that are arranged so as to oppose each other with the optical axis therebetween.

13. The lens assembly as set forth in claim 12 wherein the first guiding shaft, the second guiding shaft, the second driver, and the first driver are arranged in the stated order in the circumferential direction of the circle that is centered on the optical axis.

14. The lens barrel as set forth in claim 13, wherein the pair of first guiding shafts and the pair of second guiding shafts are positioned at substantially the same distance from the optical axis.

\* \* \* \* \*